No. 717,204. Patented Dec. 30, 1902.
C. W. HUNT.
VEHICLE WHEEL.
(Application filed Oct. 1, 1902.)
(No Model.)
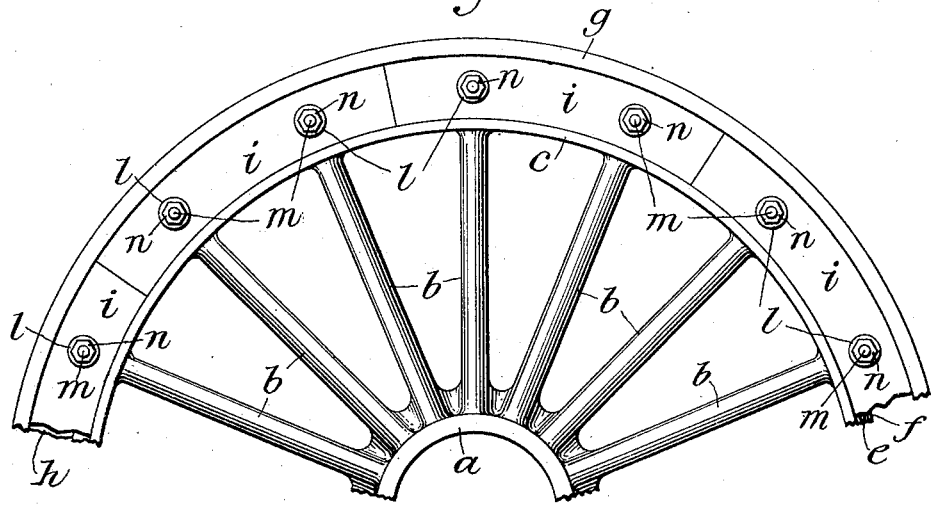
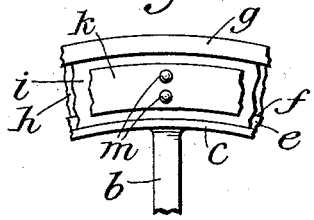
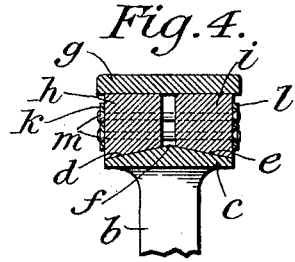
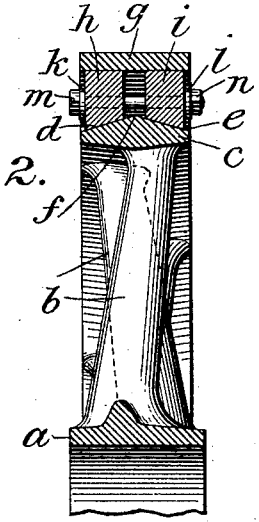
Attest:
A. N. Jesbera
M. A. Brayley
Inventor:
Charles Wallace Hunt
by Redding, Kiddle & Greeley
Attys.

UNITED STATES PATENT OFFICE.

CHARLES W. HUNT, OF WEST NEW BRIGHTON, NEW YORK.

VEHICLE-WHEEL.

SPECIFICATION forming part of Letters Patent No. 717,204, dated December 30, 1902.

Application filed October 1, 1902. Serial No. 125,500. (No model.)

*To all whom it may concern:*

Be it known that I, CHARLES WALLACE HUNT, a citizen of the United States, residing in West New Brighton, borough of Richmond, city of New York, State of New York, have invented cerain new and useful Improvments in Vehicle-Wheels, of which the following is a specification, reference being had to the accompanying drawings, forming a part hereof.

The particular object of this invention is to improve the construction of wheels for vehicles in such a manner as to provide a cushion which shall reduce the violence of the shock when the wheel of a road-vehicle strikes an obstacle, such as a paving-stone or a car-track.

It will be obvious that the improvement is capable of application to wheels constructed of metal or in part of wood.

In accordance with the invention the cushion is interposed between the rim of the wheel and the tire and is there held in place by means which will be fully described hereinafter with reference to the accompanying drawings, in which an embodiment of the invention is represented and in which—

Figure 1 is a view in side elevation of a portion of a wheel constructed in accordance with the invention. Fig. 2 is a transverse sectional view of the same. Figs. 3 and 4 are detail views, in elevation and transverse section, respectively, showing rivets or headed rods in place of the threaded bolts shown in Figs. 1 and 2.

The body of the wheel, including the hub $a$ and the spokes $b$, is constructed in any suitable manner and of any suitable material, according to the purposes for which the vehicle is intended to be used. The rim $c$ of the wheel is also constructed of any suitable material, although in the form represented in the drawings it is of metal and made integral with the spokes and hub. The face of the wheel-rim instead of being flat or grooved, as is sometimes the case, is angular, having two faces $d$ and $e$, inclined away from the median line $f$. The tire $g$ is a comparatively hard or inelastic tire, as steel or iron, and made of ordinary form, having a substantially flat inner face, the cushion being interposed between the tire and the angular face of the wheel-rim.

The cushioning device may be of any suitable material—such as rubber, wood, compressed cork, or other elastic or semi-elastic material—and is formed in opposing parts $h$ and $i$, which are curved to conform to the curvature of the wheel-rim and of the tire and have their concave faces oppositely beveled, as shown in Fig. 2, to fit the beveled or inclined faces of the wheel-rim, while their outer or convex faces are parallel with the wheel-axis to fit against the inside of the tire $g$. Each of the parts $h$ and $i$ may be formed in one piece or several pieces, and they may be provided upon their outer lateral faces with washers or plates $k$ and $l$, respectively. Threaded rods or bolts, as shown at $m$ in Figs. 1 and 2, or headed rods or rivets, as shown at $m$ in Figs. 3 and 4, are passed through the opposing parts $h$ and $i$, the threaded rods or bolts being provided with nuts $n$, which may be set up on the bolts or the rods, as shown in Figs. 3 and 4, being headed up in the usual manner to press or hold the opposing parts $h$ and $i$ toward each other and at the same time by the action of the inclined faces $d$ and $e$ of the wheel-rim to force them outward tightly against the tire $g$, the angular face of the wheel-rim locking the parts thus held together against lateral displacement. Thus the desired cushioning action of the elastic or semi-elastic material interposed between the body of the wheel and the tire is secured and the tire itself and the cushioning material are securely fastened upon the body of the wheel.

It will be obvious that the shape of the wheel-rim and of the tire may be varied from what is shown in the drawings and that other means for pressing the opposing parts of the cushion material toward each other may be employed.

It is acknowledged that a pneumatic tire circular in cross-section has been held upon an oppositely-beveled rim by metal clamp-rings tied together by screws or bolts and that a cushion has been interposed between a flanged rim and a metallic tire, a part of the flanged rim being held in place by bolts or otherwise; but it is not sought herein to cover a construction or arrangement of the character of either of these.

I claim as my invention—

1. The combination with a wheel having a rim with inclined faces and a comparatively hard or inelastic tire, of a cushion interposed between the wheel-rim and the tire, said cushion consisting of opposing parts of elastic or semi-elastic material coöperating with the inclined faces of the wheel-rim, and means to hold said opposing parts toward each other, substantially as shown and described.

2. The combination with a wheel having a rim with inclined faces and a comparatively hard or inelastic tire, of a cushion interposed between the wheel-rim and the tire, said cushion consisting of opposing parts of elastic or semi-elastic material coöperating with the inclined faces of the wheel-rim, and rods passed through the opposing parts to hold them toward each other, substantially as shown and described.

This specification signed and witnessed this 9th day of September, A. D. 1902.

CHARLES W. HUNT.

In presence of—
JOHN F. SMITH,
HOWARD B. STAVERS.